United States Patent

[11] 3,584,423

| [72] | Inventor | Stanley William Hoare<br>Peterborough, England |
|------|----------|---------------------------------------------|
| [21] | Appl. No. | 815,874 |
| [22] | Filed | Apr. 14, 1969 |
| [45] | Patented | June 15, 1971 |
| [73] | Assignee | The Newell Engineering Company Limited<br>Peterborough, England |

[54] CRANKPIN GRINDER
6 Claims, 4 Drawing Figs.

[52] U.S. Cl.................................................. 51/105,
51/237
[51] Int. Cl.................................................. B24b 5/42
[50] Field of Search......................................... 51/105 SP,
105 ECC, 237 CS

[56] References Cited
UNITED STATES PATENTS

| 2,651,895 | 9/1953 | Rocks.......................... | 51/237 X |
| 2,809,472 | 10/1957 | Happel........................ | 51/105 |

*Primary Examiner*—Lester M. Swingle
*Attorney*—Watson, Cole, Grindle and Watson ABSTRACT: A crankpin grinder in which for controlling the rotary indexing of the workheads a spindle whose angular position controls the indexing carries two shouldered notches defining end positions spaced by 180°, two pivoted pawls linked by a spring engage the notches one at a time to determine precisely the angle through which the spindle turns during indexing.

CRANKPIN GRINDER

This invention relates to crankpin grinders for grinding the pins of a crankshaft having at least two pins or sets of pins offset in different directions from the crankshaft's axis.

The general structure of a crankpin grinder is well known and will not be described in detail except in so far as is necessary for the understanding of the present invention. Basically, the grinder comprises a pair of work heads which normally support the ends of the crankshaft and provide rotation of the crankshaft in order that a pin in contact with grinding wheel can be rotated during the grinding of its surface. The (or each) grinding wheel is rotatable about an axis parallel to the crankshaft's axis and is normally indexable in a direction parallel to the crankshaft axis in order that it may grind different pins, although it will be understood that more than one grinding wheel can be provided if it is desired to grind simultaneously all or part of a set of in-line pins. Apart from this type of indexing however it is also necessary to provide rotary indexing of the crankshaft. Since a crankpin is offset by its "throw" from the crankshaft's axis, it is necessary to provide work heads which, before a particular pin or set of pins is ground, bring that pin or set of pins into line with the work head spindles. This is commonly achieved employing throw blocks which incorporate chucks rotatable about an axis parallel to the work head spindle axis and displaced from it by a distance equal to the throw of the crankshaft.

The present invention relates to the control of this rotary indexing and is intended to ensure that a particular crankpin or set of pins is correctly indexed.

An important consideration with the present invention is that the angle between the throws of different pins or sets of in-line pins is related to the number of sets of pins. In order to provide proper balance in the engine or apparatus for which the crankpin is used, where there are two sets of in-line pins the angle is 180°, for three sets the angle is 120° and so on. It is thus possible to say that the problem of providing accurate rotary indexing is essentially the problem of ensuring that the rotation of the workpiece provided by the throw block must be through a precisely determined angle when the workpiece (crankshaft) is indexed from one angular position to another, that is to say between a position in which one set of pins is correctly located for grinding to a second position in which another set of pins is correctly located for grinding. For convenience the term "set of pins" means a set of in-line pins and is intended to include a set having only one pin.

It is to the above-mentioned problem that the present invention is primarily directed, the main object of the invention being the provision of means whereby the movement of the crankshaft during rotary indexing from a first position to a second position is precisely 180°, 120° or, in general 360/N where N is the number of sets of in-line pins.

BRIEF SUMMARY OF THE INVENTION

According to the invention, in a grinding machine having a pair of workheads for supporting the two ends of a crankshaft and for providing rotation thereof about a first axis while a set of pins of the crankshaft is in contact with a grinding wheel or wheels, and rotary indexing means for rotating the crankshaft about a second axis offset from the first axis so as to move the crankshaft from a first angular position, in which one set of pins is aligned with the first axis, to a second angular position, in which another set of pins is aligned with said first axis, there is provided a rotatable member whose angular position controls the angular position of the crankshaft provided by said rotary indexing means, said member having a part cooperating with a first pawl to define the first angular position and another part cooperating with a second pawl to define the second angular position, said member and pawls being arranged so that when the pawls are in position rotation of the member moves one of the parts away from its pawl and, when indexing between the first and second angular positions is completed, the other part into engagement with its associated pawl.

Conveniently there is equality between the angle through which the member moves during indexing between said first and second angular positions and the actual angle between said first and second angular positions of said crankshaft and preferably said member is, or is coaxially mounted and movable with, a spindle aligned along said second axis. The said parts may comprise shouldered notches which when engaged by a pawl permit the member to move in the direction such that the other pawl approaches its notch but prevent movement of the member in the other direction. Conveniently also there are provided means for rotating said member, which means may be arranged to urge the member into engagement with the said parts depending on the direction of rotary indexing.

The present invention may be explained by means of a typical example. Assuming there to be two sets of in-line pins, then normally the sets of pins would have throws in directions 180° spaced from each other. Accordingly, if one of the sets of pins is in the correct position aligned with the workhead's axis then, after the grinding of those pins, it is necessary to index the crankshaft through 180° to position the other set of pins properly. It is usually also necessary to provide axial indexing of the crankshaft with respect to the grinding wheel or wheels; this can usually be achieved by appropriate movement of the work supporting table, but this operation is self-evident and is not part of the present invention. Accordingly, said parts are conveniently spaced by 180° on said member. It is possible for them to be spaced by a multiple or submultiple of 180° and to provide appropriate gearing to control the indexing but in the most convenient arrangement the angle will be 180°. During grinding of the first set of pins one of the pawls will be engaged with its associated notch and will be urged against it by moving means which forms part of said rotary indexing means. During rotary indexing, the member is rotated through 180° and the arrangement of the pawls is such that the second pawl, which now normally rests on the periphery of the member, moves into engagement with the notch associated with the second position. One of the advantages of the present invention is that it is fairly simple to ensure that the means for moving the shaft will urge the shaft to maintain a notch in engagement with its pawl and accordingly the crankshaft is maintained in the proper position during grinding of the second set of pins.

DETAILED DESCRIPTION OF THE PREFERRED EMBODIMENT

Figure 1:
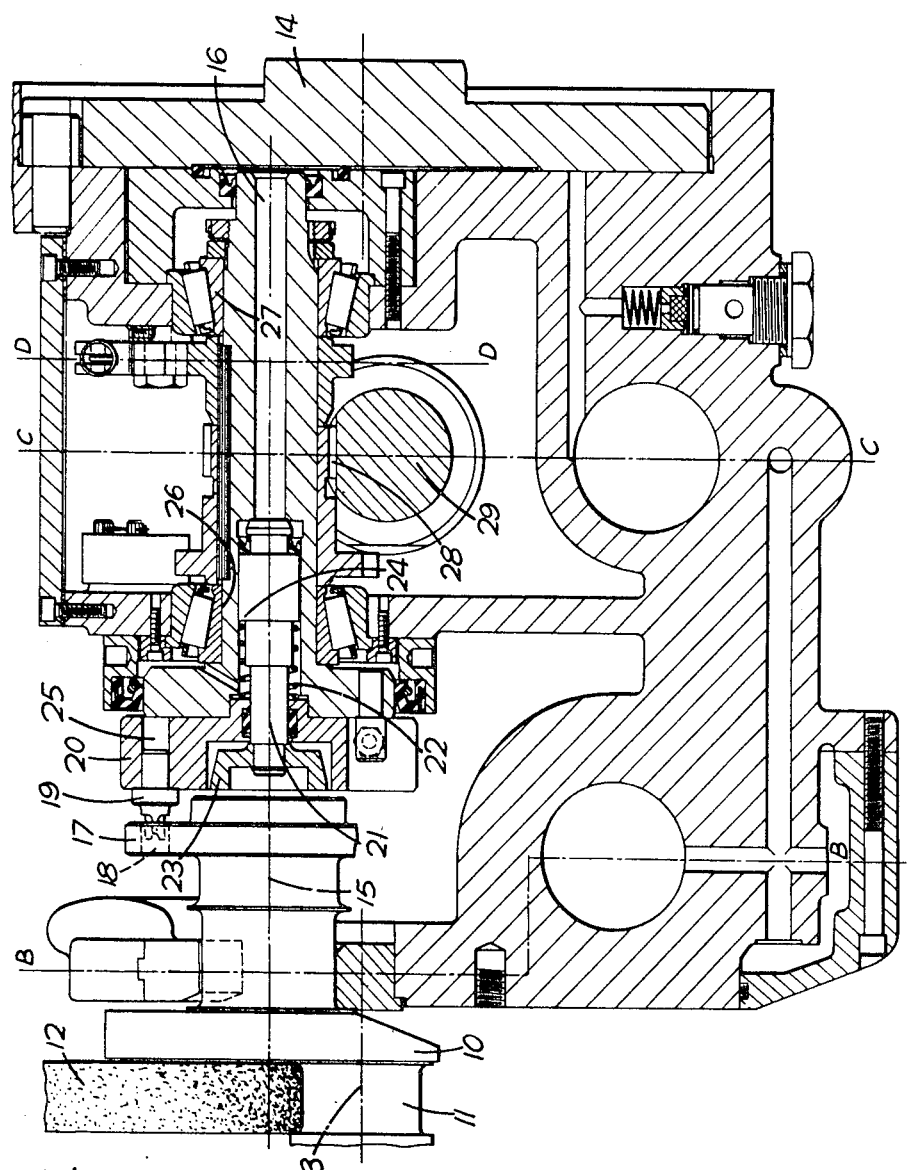
FIG. 1 is a view in section of a throwblock of a grinding machine embodying the invention.

In FIG. 1 are shown the principal parts of a throwblock in a crankpin grinder. It will be understood that there are normally two throwblocks, each associated with a workhead. In FIG. 1, a crankshaft 10 is in position for the grinding of one of its pins 11 by a grinding wheel 12. The axis of the pin 11 is aligned with the axis 13 of the workhead spindles, one of whose end flanges is shown at 14. The axis 15 of the crankshaft is aligned with the spindle 16 whose axis is offset from the axis 13 by the "throw" of the pin 11. The customary end plate 17 of the crankshaft is dowelled at 18, as is usual practice. For rotating the crankshaft to provide radial indexing, a locating pin 19 extends into the dowel 18, the pin 19 being mounted in a recess 25 in a chuck 20 which is itself retained on an extension 21 from the spindle 16 by a push rod collar 23. A compression spring 22 is located between the shoulder 24 and the chuck 20. The spindle 16 is mounted in bearings 26 and 27 and in this embodiment constitutes the aforementioned rotatable member.

Figure 2:
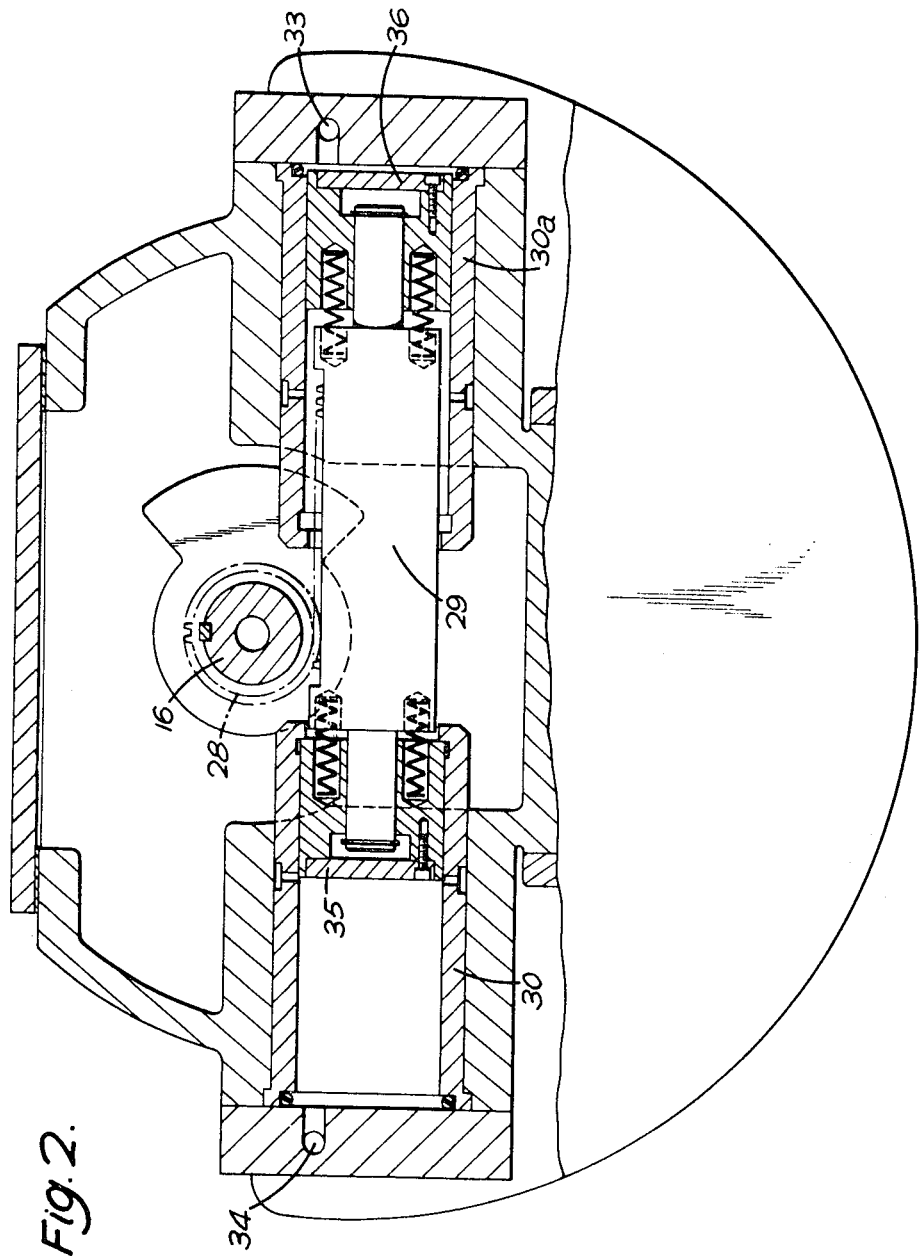
FIGS. 2, 3 and 4 are sectional views through various parts of the throwblock shown in FIG. 1.

The arrangement for rotating the spindle 16 is shown in detail in FIG. 2 which is a partial section on the line C–C through FIG. 1. The spindle 16 carries a gear 28 which is in engagement with a rack 29 movable transverse the axis of the spindle 16 and slightly below it. The rack 29 is supported by the piston heads 35 and 36 which piston heads are movable in cylinders 30 and 30a respectively. The cylinders have ports 33 and 34 for the application of pneumatic pressure to move the rack from left to right or vice versa. It will be apparent that when fluid is let in through port 33 the port 34 must provide an exhaust so that piston head 35 can traverse leftwards and vice versa. However, such an arrangement will be obvious to those skilled in the art as will be the means for applying pneumatic pressure to the ports 33 and 34. It will be seen that the cylinders 30 and 30a are mounted in and rotatable with the throwblock.

Figure 3:
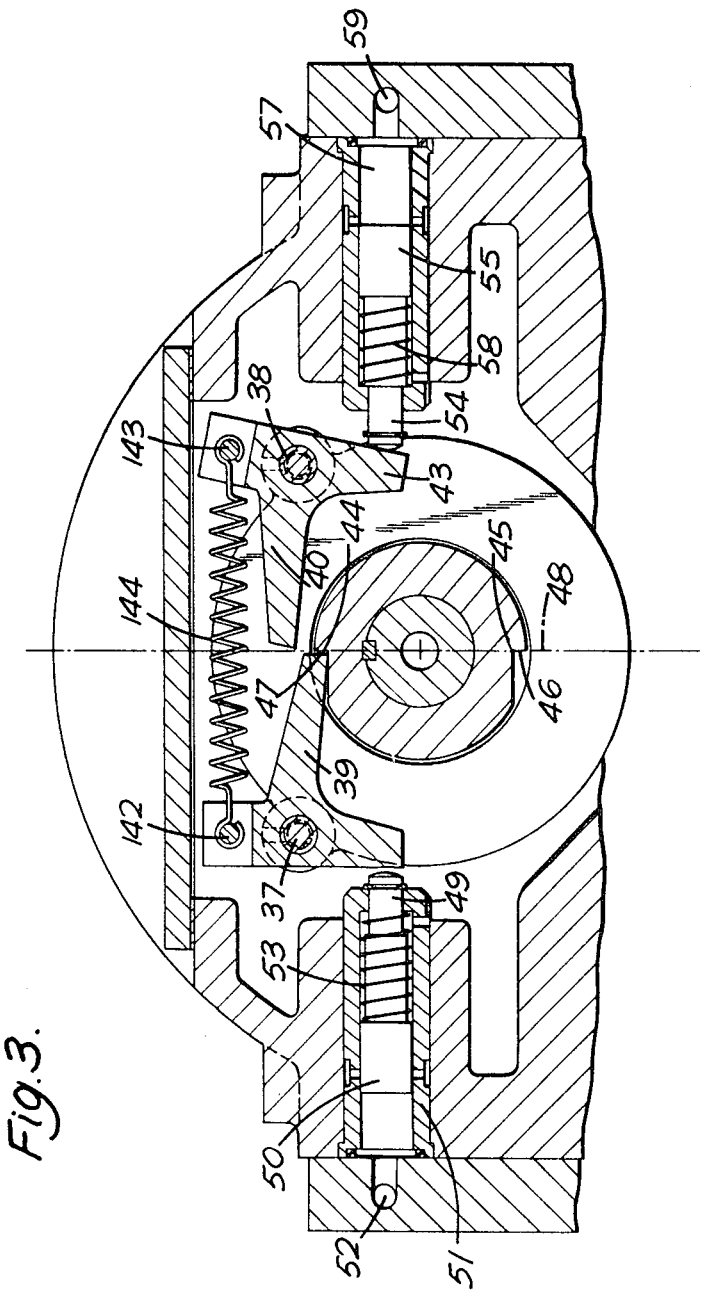

FIG. 3 shows the arrangement by which the angular position of the spindle 16 and hence the angular position of the crankshaft is controlled. It will be understood that in the embodiment described there is to be rotary indexing through 180° between the grinding of different sets of crank pins. FIG. 3, which is a section on the line D-D of FIG. 1, shows the spindle 16 having two shouldered notches 44 and 45 whose shoulders 47 and 46 are arranged on a diametral line 48. Mounted on a pin 37 and a pin 38 respectively are pawls 39 and 40. The pins 37 and 38 are aligned parallel to the axis of the throwblock spindle 16. The pawl 39 can engage in the notch 44 whereas the pawl 40 can engage in the notch 45 when the spindle 16 is rotated clockwise through 180° from the position shown. The pawls have to be arranged so that when they abut the shoulders 47 and 46 respectively there is 180° precisely of movement between the two positions of the spindle 16. It will be seen that from the position shown the shaft 16 can only rotate through a clockwise arc to bring the pawl 40 into engagement with the notch 46. The pawls are linked by a tension spring 144 anchored on pins 142 and 143 in the upper halves of the pawls.

The pawls are movable by means of pistons 50 and 55 respectively arranged in cylinders 51 and 57 having combined inlet and exhaust ports 52 and 59. Compression springs 53 and 58 are arranged between the outer faces of the pistons and the outer ends of the cylinders and a simple pneumatic arrangement (not shown for convenience) is operable to inlet fluid pressure to the port 52 and provide exhaust from the port 59 or vice versa according to whether it is desired to raise pawl 39 or pawl 40. From the position shown in the drawing, advance of the piston 50 moves the head 49 to raise pawl 39 out of engagement with the notch 44. At the same time, exhaust from port 59 permits retraction of piston 55 by the force exerted by the tension spring 144, the butt 43 of pawl 40 urges against head 54 of piston 55. The spring 144 also serves to keep pawl 40 in engagement with the peripheral surface of the spindle 16 when the pawl 40 is lowered. It will be noted that it is not essential for the shoulders 46 and 47 to be on a diametral line provided that the shoulders cooperate with their respective pawls to provide precisely 180° of movement between the two engaged positions. However, the arrangement shown in the drawings is the most convenient.

The operation of the crank pin grinder described so far proceeds, after the crank pin has been loaded, as follows. After ensuring that the spindle 16 is in one of its two end positions a set of crank pins pertaining to that position is ground whereupon the grinding wheels are traversed away from the pins and by means of inlet hydraulic pressure to the appropriate cylinder of FIG. 2 the rack 25 is moved to traverse the spindle 16. At the same time the engaged pawl 39 and 40 is raised and the other lowered, the rotary indexing continuing until the lowered pawl engages the notch associated with the other predetermined angular position. The set of crank pins pertaining to that position is then ground and the crankshaft unloaded from the machine.

For different numbers of sets of pins, more complex arrangements, using other sets of notches and pawls (for example) are necessary.

Figure 4:
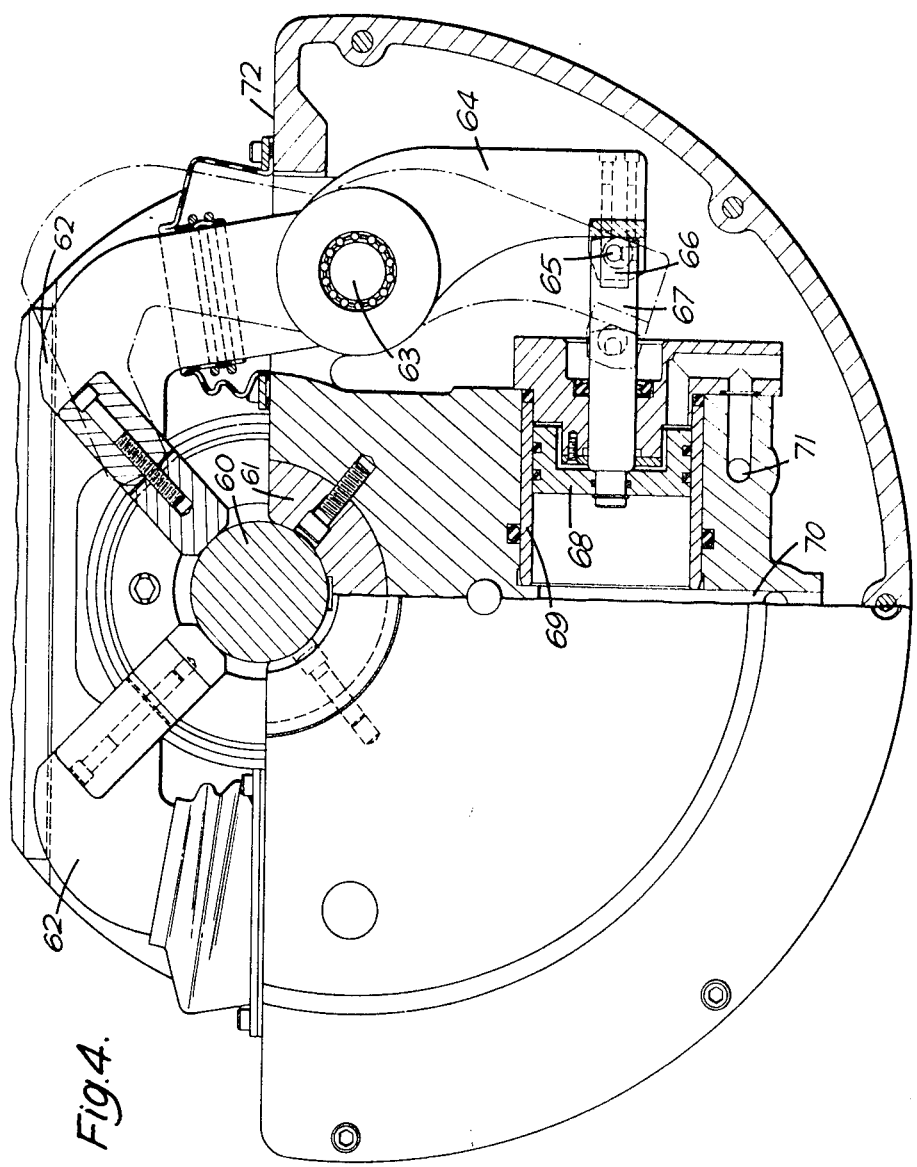

A further feature of the present invention concerns the automatic loading and unloading of the crankshaft from the machine. It is desirable that the crankshaft be loaded into or unloaded from a position such that the cranks of one set of pins at least and both sets where there are only two sets of pins are vertical. This normally corresponds to the correct position for grinding one set of pins. Furthermore, throwblocks are conventionally constructed so as to have a semicircular groove for receiving the crankshaft with two retractable clamps which when the crankshaft is in position clamp it securely to the throwblocks. This may be explained with the aid of FIG. 4. This shows a part sectional view on the line B-B through the throwblock of FIG. 1. The numeral 60 denotes the relevant journal of the crankshaft which is received in a semicircular groove 61 and, when in position, is clamped by jaws 62 which are similar and which the right-hand one only is shown as pivoted at 63, having an extending arm 64 carrying a pin 65 locating in an aperture 66 of a piston rod 67, the piston rod 67 being attached to a piston head 68 movable in a hydraulic cylinder 69 having inlet and outlet ports 70 and 71. The cylinder 69 in fact also serves to move both jaws and has a single central port 70 and two end ports 71 for moving both pistons together.

It will be apparent that for automatic loading of the machine the crankshaft should only be loaded and unloaded only when the throwblock is arranged with its surface 72 horizontal that is to say with the groove 61 facing vertically. This arises because the crank pins are normally loaded and unloaded using an overhead conveyor.

The motor used for rotating the throwblocks during grinding can be used for providing "indexing" of the throwblocks to the positions for loading and unloading and as a preferred feature of this invention the motor may be arranged to have two speeds, the higher being used for rotation of the throwblocks during grinding and the lower being used for moving the throwblocks to or from an unloading or loading position as the case may be.

I claim:

1. In a grinding machine having a pair of workheads for supporting the two ends of a crankshaft and for providing rotation thereof about a first axis while a set of pins of the crankshaft is in contact with a grinding wheel, rotary indexing means for rotating the crankshaft about a second axis offset from the first axis so as to move the crankshaft from a first angular position in which one set of pins is aligned with the first axis to a second angular position in which another set of pins is aligned with said first axis comprising a rotatable member whose angular position controls the angular position of the crankshaft provided by the rotary indexing means, first and second pawls, said rotatable member having a part cooperating with the first pawl to define the first angular position and another part cooperating with the second pawl to define the second angular position, said member and pawls being disposed so that rotation of the rotatable member moves one of the said parts away from its pawl and, when indexing between the first and second angular positions is completed, the other said part into engagement with its associated pawl.

2. A grinding machine as set forth in claim 1 in which the aid parts each comprises a shouldered notch, each notch when engaged by the respective pawl permitting the rotatable member to rotate in one direction and preventing rotation of the rotatable member in the reverse direction.

3. A grinding machine as set forth in claim 1 further comprising means mounting each pawl for rotation and spring means linking said pawls, whereby when either pawl is moved away from the associated one of the said parts the spring means tends to move the other pawl into engagement with the associated one of the said parts.

4. A grinding machine as set forth in claim 3 in which there is provided for each pawl a fluid actuated piston and cylinder assembly for moving the pawl out of engagement with the associated part.

5. A grinding machine as set forth in claim 1 in which the rotatable member is a spindle aligned along the second axis.

6. A grinding machine according to claim 5 further comprising a gear carried by the said spindle, a rack engaged by said gear, means mounting said rack for movement transverse the said spindle and means for moving said rack.